United States Patent [19]
Zehavi et al.

[11] Patent Number: 5,469,695
[45] Date of Patent: Nov. 28, 1995

[54] TREE-SHAKING AND HARVESTING APPARATUS

[76] Inventors: Eitan Zehavi, Kiriat Tivon; David Chiel, Afula Ilit, both of Israel

[21] Appl. No.: 165,028

[22] Filed: Dec. 9, 1993

[51] Int. Cl.$^6$ ............................................. A01D 46/26
[52] U.S. Cl. ................................ 56/340.1; 56/329
[58] Field of Search .................. 56/340.1, 1, 328.1, 56/329

[56] References Cited

U.S. PATENT DOCUMENTS

| | | | |
|---|---|---|---|
| 1,626,068 | 4/1927 | Barlett. | |
| 2,692,470 | 10/1954 | Boman | 56/328 |
| 3,021,168 | 2/1962 | Bodine | 294/88 |
| 3,041,811 | 7/1962 | Sides | 56/328 |
| 3,084,967 | 4/1963 | Harrett | 294/86 |
| 3,121,304 | 2/1964 | Herbst | 56/328 |
| 3,163,458 | 12/1964 | Brandt, Jr. | 294/88 |
| 3,318,629 | 5/1967 | Brandt, Jr. | 294/103 |
| 3,335,556 | 8/1967 | Edgemond, Jr. | 56/328 |
| 3,338,040 | 8/1967 | Shipley, Jr. | 56/328 |
| 3,414,314 | 12/1968 | Martin | 294/103 |
| 3,479,806 | 11/1969 | Pool et al. | 56/328 |
| 3,507,101 | 4/1970 | Bernhausen | 56/1 |
| 3,545,182 | 12/1970 | Bernhausen | 56/1 |
| 3,548,578 | 12/1970 | Shipley, Jr. | 56/328 |
| 3,548,579 | 12/1970 | Shipley, Jr. | 56/329 |
| 3,553,949 | 1/1971 | Rauth | 56/329 |
| 3,596,455 | 8/1971 | Adrian | 56/329 |
| 3,596,972 | 8/1971 | Pool | 294/103 |
| 3,621,643 | 11/1971 | Gerrans | 56/329 |
| 3,623,308 | 11/1971 | Nye | 56/328 |
| 3,635,004 | 1/1972 | Webb et al. | 56/235 |
| 3,650,099 | 3/1972 | Sitter | 56/328 |
| 3,656,283 | 4/1972 | Shipley | 56/1 |
| 3,771,301 | 11/1973 | Favor | 56/328 |
| 3,771,768 | 11/1973 | Gebendinger | 259/1 |
| 3,780,510 | 12/1973 | Tompkins | 56/328 |
| 3,793,815 | 2/1974 | Hughes | 56/328 |
| 3,896,612 | 7/1975 | McHugh et al. | 56/329 |
| 4,128,986 | 12/1978 | Santarelli | 56/328 |
| 4,194,347 | 3/1980 | Peters | 56/328 |
| 4,254,608 | 3/1981 | Friday | 56/328 |
| 4,269,021 | 5/1981 | Friday | 56/329 |
| 4,903,471 | 2/1990 | Bunnelle | 56/340.1 |
| 5,123,238 | 6/1992 | Renehan | 56/329 |
| 5,189,871 | 3/1993 | Frederiksen et al. | 56/329 |
| 5,191,758 | 3/1993 | Cote | 56/329 |

*Primary Examiner*—Terry Lee Melius
*Attorney, Agent, or Firm*—Cesari and McKenna

[57] ABSTRACT

A tree-shaking apparatus includes a vibration mechanism of conventional design mounted on a movable, tilted frame support that serves to deflect falling harvest onto a conveyor and collection assembly, which is mounted on a separately movable frame support. The shaking and collection units are brought separately to the tree, and unite with one another by means of rods that interlace during operation. In one embodiment, the rods associated with the shaking and deflection unit are selectibly extendible, while those associated with the collection unit flip into place and, upon completion of harvesting, flip back, thereby tipping any remaining harvest onto the conveyor.

13 Claims, 3 Drawing Sheets

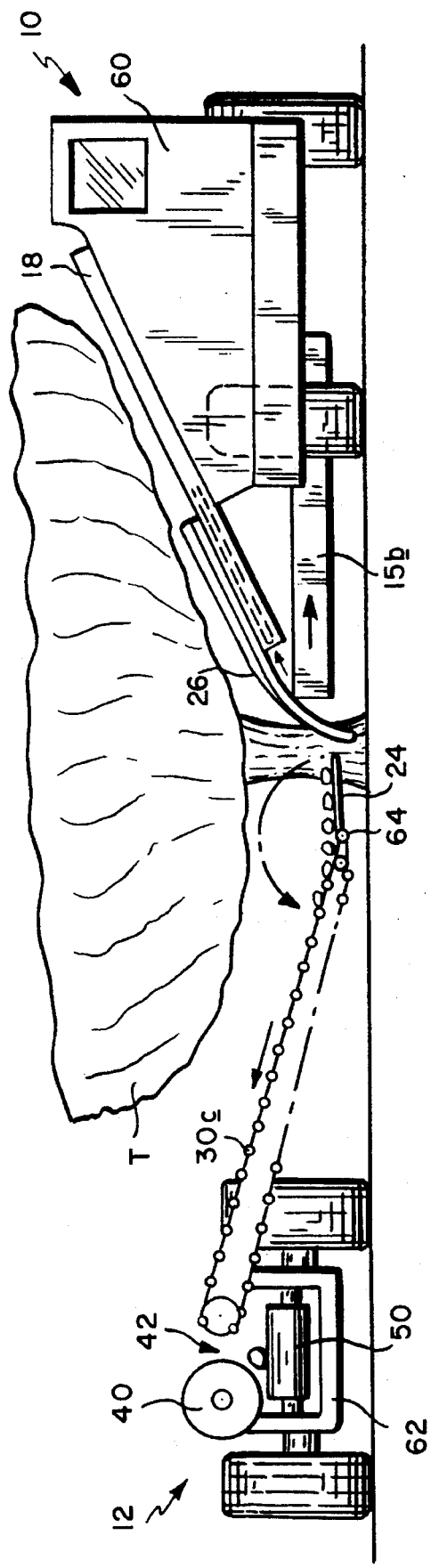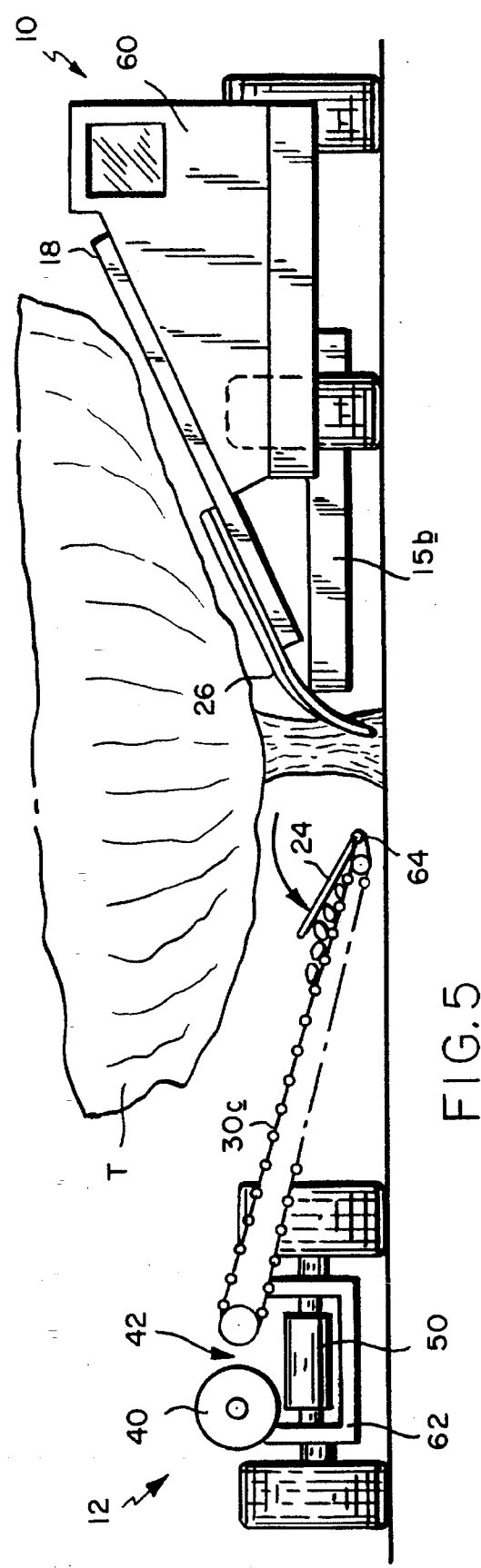

TREE-SHAKING AND HARVESTING APPARATUS

BACKGROUND OF THE INVENTION

1. Field of the Invention

The present invention relates to fruit- and nut-harvesting equipment, and more particularly to apparatus for shaking fruit and nuts from the limbs of trees.

2. Description of the Related Art

Mechanical devices for harvesting fruit and nuts from trees typically operate by gripping the tree trunk and imparting thereto a controlled, low-frequency vibration or shaking action. This operation dislodges the fruit or nuts, which are then collected and transported.

A typical tree-shaking apparatus includes two opposing clamp members that engage the tree trunk, and which are themselves driven by dual oscillation or vibration units. Because droppage occurs over the relatively wide area corresponding to the extent of the tree's foliage, suitable collection apparatus must span this area yet be conveniently transportable from tree to tree. Such apparatus should also include a local conveying assembly for drawing the harvest into a single container as it falls from the tree.

One common approach to collection is illustrated in U.S. Pat. Nos. 4,269,021, 3,623,308, 5,191,758, 5,123,238, and 1,626,068. In each of these patents a segmented, fan-shaped collection net, its panels canted to form a bowl, surrounds the tree so that falling fruit or nuts gather at the bottom of the net. From there it is transported to a bin by means of conveyors or the like. These arrangements are large and cumbersome, particulary when fully open, and can be difficult to maneuver into the precise position necessary for the net to properly encircle the tree. They must be fully opened before a tree is shaken and are ordinarily fully closed prior to transport to the next tree.

Another collection approach is set forth in U.S. Pat. No. 3,548,579, which discloses a two-part apparatus that encloses the tree from opposite sides as it is shaken. The fruit or nut harvest accumulates in opposing slack, flexible sheets that elevate and tilt when shaking is complete, causing the harvest to roll off onto a collection conveyor. This arrangement requires a relatively elaborate construction to provide the necessary snapping and tilting actions of the different components and to coordinate their interplay.

DESCRIPTION OF THE INVENTION

Objects of the Invention

Accordingly, it is an object of the present invention to provide a tree-shaking apparatus that includes a mechanically straightforward collection assembly that does not require special movements.

It is another object of the invention to provide a fruit- and nut-harvesting apparatus that can be easily maneuvered to a tree.

It is a further object of the invention to provide a fruit- and nut-harvesting apparatus that can tolerate a range of orientations without loss of collection efficiency.

Other objects will, in part, be obvious and will, in part, appear hereinafter.

The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

BRIEF SUMMARY OF THE INVENTION

In accordance with the invention, a tree-shaking apparatus includes a vibration mechanism of conventional design mounted on a movable, tilted frame support that serves to deflect falling harvest onto a conveyor and collection assembly, which is mounted on a separately movable frame support. The shaking and collection units are brought separately to the tree, and unite with one another by means of rods that interlace during operation. This arrangement permits imprecise alignment between the two units, and does not require any special positioning of the collection unit, because the rods will interlace even if the units are slightly skewed with respect to one another around the tree.

In one embodiment of the invention, the rods associated with the shaking and deflection unit are selectibly extendible, while those associated with the collection unit flip into place and, upon completion of harvesting, flip back, thereby tipping any remaining harvest onto the conveyor.

In one version of this embodiment, the collection-unit rods are arranged in two series with a gap therebetween. The gap is positioned adjacent the tree during operation, and a portion of the shaking unit overhangs the collection unit such that harvest falling above the gap area is guided directly onto the conveyor. In a second version of this embodiment, the collection-unit rods are closely spaced across the entire length of the unit, and completely surround the tree by extending fully (or to ground level) on either side of the tree but remaining partly retracted adjacent the tree so as to rest against or, preferably, near its trunk.

All of the foregoing designs are mechanically straightforward and conveniently transportable from tree to tree.

BRIEF DESCRIPTION OF THE DRAWINGS

The foregoing discussion will be understood more readily from the following detailed description of the invention, when taken in conjunction with the accompanying drawings, in which:

FIG. 4 illustrates the manner in which the units shown in FIG. 3 are returned to the standby configuration; and FIG. 5 shows the units after shaking is completed, in the standby configuration ready for advancement to another tree.

DETAILED DESCRIPTION OF THE PREFERRED EMBODIMENTS

Figure 1:
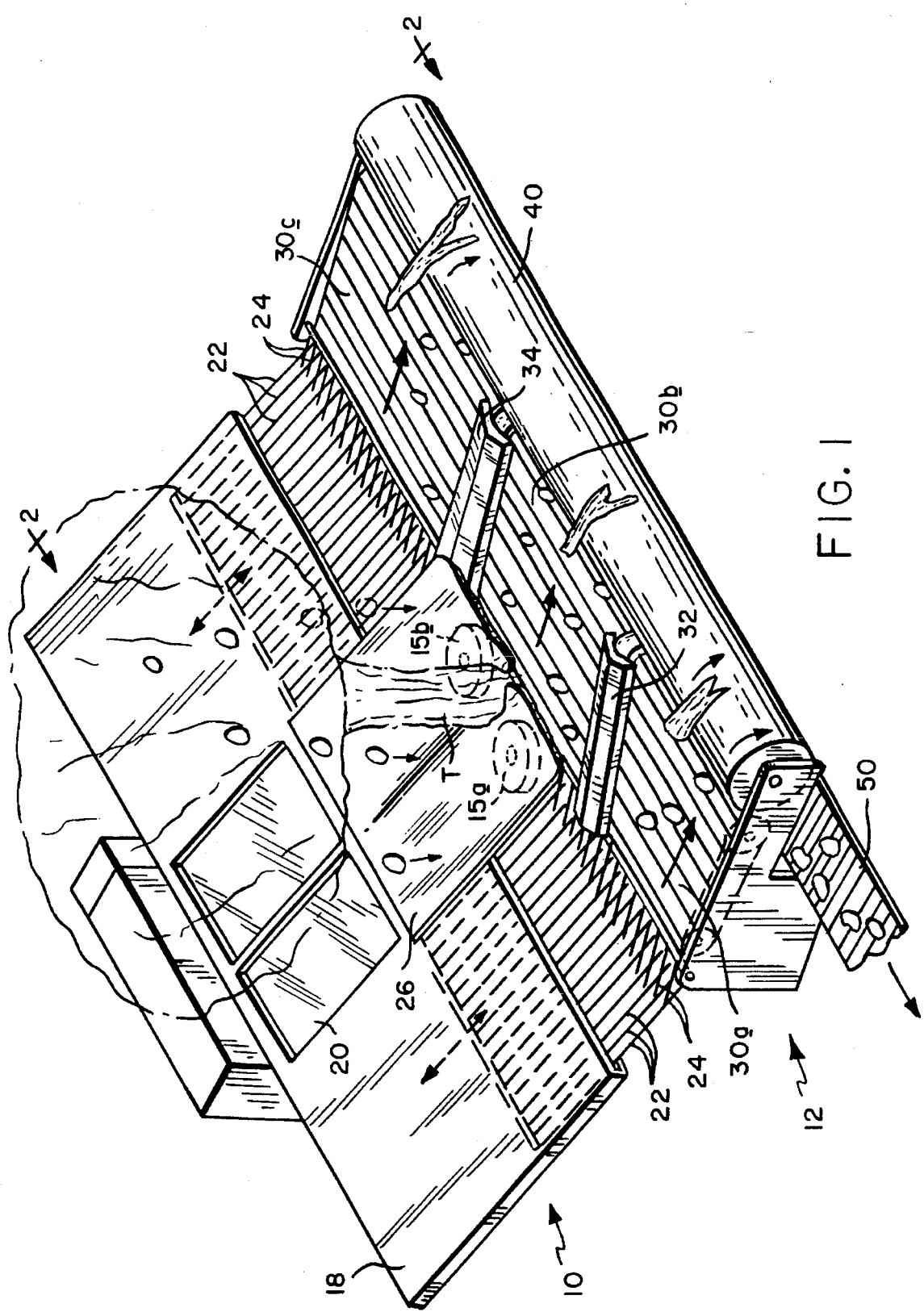
FIG. 1 is an isometric view of both the collection and shaking components of the present invention, shown in an operating configuration.

Refer first to FIG. 1, which shows the two primary components of the present invention, namely, a shaking and deflection unit 10 and a collection unit 12. Shaking unit 10 imparts vibration to a tree T by means of two oscillation units and 15a and 15b, which engage opposite sides of the tree. Oscillation units 15a and 15b can be of standard design (see, e.g., U.S. Pat. Nos. 3,338,040, 3,548,578 and 4,903,471) or in accordance with the teachings of copending application Ser. No. 08/165,026, filed Dec. 9, 1993 and entitled TREE-SHAKING APPARATUS WITH DIRECTION AND FREQUENCY OPTIMIZATION CAPABILITY, commonly owned with the present invention and hereby incorporated by reference).

Shaking unit 10 also includes a tilted planar face 18, which is resilient enough to withstand the bombardment of harvest as it falls from the tree being shaken, and which guides the harvest toward the collection unit 12. A window 20 is preferably provided in face 18 to allow the driver to conveniently position the unit 10 so that oscillation units 15a and 15b, when extended as described below, will flank tree T.

A key feature of shaking unit 10 is a series of rods or "fingers" 22 arranged in two clusters on opposite sides of oscillation units 15a and 15b. Rods 22 are spaced sufficiently close to one another to prevent harvested fruit or nuts from slipping between them and falling to the ground. Collection unit 12 contains a complementary series of rods 24, also arranged in opposing clusters with a gap therebetween, and which interlace with rods 22 during operation. Although rods 22 and 24 are preferably fabricated from a strong, resilient material such as stainless steel, their lengths are preferably sufficient to permit some flexion upon impact by fruit or nuts; this action absorbs some of the force of that impact, ensuring a relatively gentle collection. Longer lengths also expand the range of acceptable unit orientations by permitting the rods to interlace over a wider range of skew angles. Accordingly, lengths of at least 1 meter are preferred.

The portion of shaking unit 10 occupied by oscillation units 15a and 15b is covered by an apron 26, which is preferably fabricated from an elastic material (such as rubber) and is also peaked, so that harvest falling thereon rolls toward one or the other cluster of rods 22. (Although it is possible to have rods 22 extend fully across the length of shaking unit 10, we prefer to use an apron to deflect harvest falling over the oscillation units; this avoids damage to the tree that may be caused by whipping of proximately located rods, as well as the mechanical difficulties of preserving a consistently small space between the rods during operation.)

Collection unit 12 gathers dislodged fruit or nuts by means of a series of conveyors 30a, 30b and 30c. These are separated by two peaked dividers 32 and 34. A longitudinal rotating brush 40 removes large debris such as leaves and branches transported by the conveyors, while the harvest falls into a gap 42 (see FIG. 2) between the conveyors and brush 40 and thereupon onto a take-off conveyor 50 for ultimate collection (for example, into a bin or other receiving container).

Refer now to FIGS. 2–5, which illustrate additional components and the mode of operation of the preferred embodiment of the present invention. As shown in these figures, both the shaking and deflection units are carried on mobile supports 60 and 62, respectively. These supports move independently by means of self-contained or attachable propulsion mechanisms, such as fuel engines, and can roll on wheels (as illustrated) or on caterpillar treads; the choice of propulsion and drive mechanisms is largely one of design, and depends on such factors as the terrain and the number of trees likely to be shaken. In the figures, shaking unit 10 is shown equipped with a self-contained propulsion and drive system that is controlled by an on-board operator, while collection unit 12 contains suitable latches and unions (not shown) for coupling to an external hauling drive.

Figure 2:
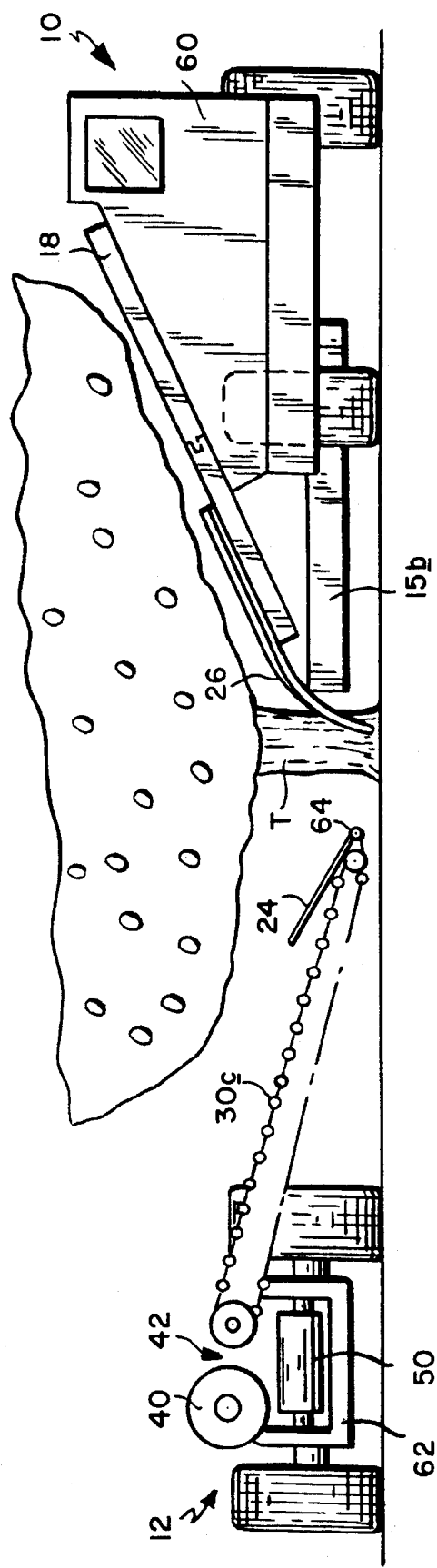
FIG. 2 is an elevational view, taken along the line 2—2 of FIG. 1, showing the collection and shaking units properly positioned for operation but in a standby configuration.
Figure 3:
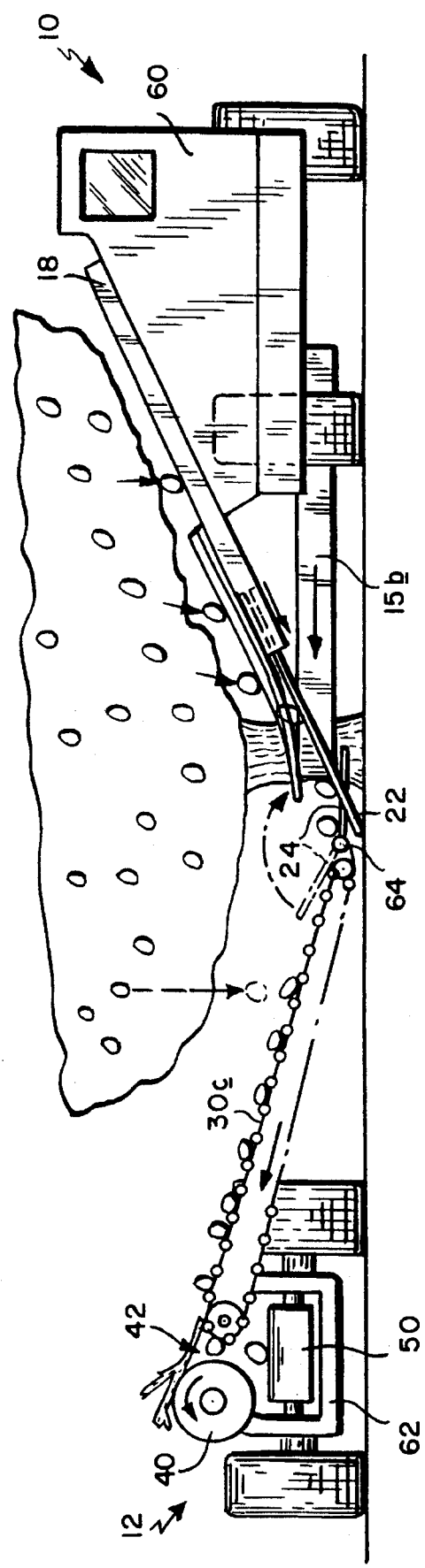
FIG. 3 illustrates the manner in which the units shown in FIG. 2 are brought into the operating configuration.

In operation, the shaking and collection units are brought to suitable locations adjacent to the tree T, as shown in FIG. 2. In the illustrated embodiment, collection-unit rods 24 pivot about a hinge 64; collection unit 12 is transported with the rods in the retracted or folded position depicted in FIG. 2 so that the gap between rod clusters faces the tree T. Shaking unit 10, on the other hand, contains rods that extend and retract rather than pivoting; shaking unit 10 is positioned such that, when the oscillation units are extended toward the tree as shown in FIG. 3, they will flank its trunk. The reciprocation mechanism for extending and withdrawing the oscillation units is powered by the drive system of unit 10, and mechanical assemblies suitable to perform this function are well-known in the art.

As the oscillation units travel toward the tree they lift apron 26 which, as noted previously and shown in FIG. 3, is peaked at its center. At the same time rods 22 extend downward, preferably under hydraulic power. The operator of collection unit 12 introduces tension into hinge 64 such that rods 24 flip downward, engaging shaking-unit rods 22. The final operating position of rods 22 can be relatively horizontal, as shown in FIGS. 3 and 4, or can instead be canted slightly upward so that dislodged material rolls toward the conveyor (one of which, designated by reference numeral 30c, is shown in the figure). During operation the outer edge of apron 26 extends, relative to tree T, past the tips of collection-unit rods 24, thereby ensuring that harvest material rolling off apron 26 lands on the collection-unit rods. Similarly, the tilt of shaking-unit rods 24 and their engagement of collection-unit rods 22 delivers harvest to the latter rods as well. Pivot 64 is located sufficiently proximate to the conveyors that harvest passing thereover will encounter a conveyor and be transported toward brush 40.

When shaking is complete, as illustrated in FIG. 4, the oscillation units retract and collection-unit rods 24 are flipped back into the folded position shown in FIG. 5, dumping any remaining harvest onto the conveyors. Shaking-unit rods 22 are retracted, and the oscillation units withdrawn from the tree. The units are then ready for transport to another tree.

Numerous variations on the foregoing design are possible. For example, the flip-action mechanism of collection-unit rods 24 can be eliminated by using hydraulically controlled extendible rods instead. In this case, the rods are canted upward to guide harvest material toward the conveyors, since the flipping collection action is unavailable. At the same time, this configuration permits rods 24 to extend across the full longitudinal length of unit 12, since they can be selectively retracted when they encounter tree T so as to avoid abrasion during shaking.

Conversely, extendible rods 22 can be replaced with flip-over rods if this is considered to be mechanically or economically advantageous.

It will therefore be seen that the foregoing represents a novel and advantageous two-part design for a fruit and nut harvester. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for harvesting fruit or nuts from a tree, the apparatus comprising:
  a. a first movable unit comprising at least one series of projecting rods that are spaced sufficiently close to one another to retain the harvest;
  b. a second movable unit comprising:
     1) a tilted planar member;
     2) means for shaking a tree; and
     3) projecting from the tilted planar member, at least one series of rods that are spaced sufficiently close to one another to retain the harvest, and are of sufficient length to interlace with the rods projecting from the first unit during operation;
  c. means for conveying the harvest from one of said series of rods to a repository, at least the other of said series of rods being tiltable so as to guide falling harvest toward the conveying means.

2. The apparatus of claim 1 wherein the conveying means is associated with the first movable unit.

3. The apparatus of claim 1 further comprising a longitudinal rotating brush, associated with the conveying means, for removing debris from the harvest.

4. The apparatus of claim 1 wherein the first-unit rods flip from a rest position into an extended position.

5. The apparatus of claim 1 wherein the first-unit rods reversibly extend.

6. The apparatus of claim 1 wherein the second-unit rods reversibly extend.

7. The apparatus of claim 5 wherein the first-unit rods are distributed across the length of the planar member and cease extending upon encountering a tree.

8. The apparatus of claim 7 wherein the first-unit rods partially retract upon encountering a tree.

9. The apparatus of claim 1 wherein the second-unit rods flip from a rest position into an extended position.

10. An apparatus for harvesting fruit or nuts from a tree, the apparatus comprising:
  a. a first movable unit comprising:
     1) at least one series of rods spaced sufficiently close to one another to retain the harvest; and
     2) means for conveying the harvest from the first-unit rods to a repository;
  b. a second movable unit comprising:
     1) a tiltable planar member;
     2) means for shaking a tree; and
     3) flanking the shaking means, two series of extendible, tilted rods which, when extended, project toward the tree-shaking means, the rods in each series being spaced sufficiently close to one another to retain the harvest and having sufficient length to interlace during operation with the rods projecting from the first unit and thereby guide falling harvest onto the first-unit rods.

11. The apparatus of claim 10 wherein the first-unit rods flip from a rest position into an extended position.

12. The apparatus of claim 10 wherein the first-unit rods reversibly extend.

13. The apparatus of claim 12 wherein the first-unit rods are distributed across the length of the planar member and cease extending upon encountering a tree.

* * * * *